United States Patent [19]
Son et al.

[11] Patent Number: 5,929,893
[45] Date of Patent: Jul. 27, 1999

[54] MULTI-CHANNEL ACOUSTO-OPTIC SPATIAL MODULATOR

[75] Inventors: Jung Young Son, Seoul, Rep. of Korea; Viacheslav M. Epikhin; Sergey A. Shestak, both of Moscow, Russian Federation

[73] Assignee: Korea Institute of Science and Technology, Seoul, Rep. of Korea

[21] Appl. No.: 08/783,015

[22] Filed: Jan. 14, 1997

[30] Foreign Application Priority Data

Sep. 6, 1996 [KR] Rep. of Korea ............... 96-38594

[51] Int. Cl.$^6$ ................................................ G02F 1/33
[52] U.S. Cl. ...................... 347/255; 347/239; 359/305; 359/313
[58] Field of Search ................................ 347/134, 239, 347/255, 135; 372/13, 22, 27; 359/305, 313

[56] References Cited

U.S. PATENT DOCUMENTS 4,000,493 12/1976 Spaulding et al. .
5,268,911 12/1993 Young ............................... 372/13

OTHER PUBLICATIONS

Adrianus Korpel, "Acousto–Optics—A Review of Fundamentals", Proceedings of the IEEE, vol. 69, No. 1, (pp. 48–53), Jan., 1981.
Peter Kellman, et al., "Integrating Acousto–Optic Channelized Receivers", Proceedings of the IEEE, vol. 69, No. 1, (pp. 93–100), Jan. 1981.
Eddie H. Young, Jr., et al., "Design Considerations for Acousto–Optic Devices", Proceedings of the IEEE, vol. 69, No. 1, (pp. 54–64), Jan., 1981.

*Primary Examiner*—N. Le
*Assistant Examiner*—Hai C. Pham
*Attorney, Agent, or Firm*—Oblon, Spivak, McClelland, Maier & Neustadt, P.C.

[57] ABSTRACT

A multi-channel acousto-optic spatial modulator for fast signal processing by a plurality of acousto-optic modulating cells connected in a line. The multi-channel acousto-optic spatial modulator in accordance with the present invention comprises a plurality of modulating cells each for modulating the incident light, acoustic waves being created within each of said plurality of modulating cells; and a plurality of absorbing plates each interposed between said two modulating cells for shielding the acoustic wave created within one of said two modulating cells from being propagated into the other of said two modulating cells. Each of the modulating cells comprises a unit crystal upon which a light is incident, a piezoelectric transducer coupled to the top surface of the unit crystal and having one pair of electrodes for allowing an acoustic wave to be created in the unit crystal in response to the signal applied to the one pair of electrodes; and an acoustic wave absorber coupled to the top surface of the unit crystal for absorbing the acoustic wave propagating in the unit crystal. Thus, a moving diffraction grating is formed within the unit crystal as the acoustic wave created by the piezoelectric transducer is reflected by one side surface of the unit crystal and propagated to the other side surface. The plurality of modulating cells are connected such that the orientation of the top surface of the unit crystal alternates with every cell.

13 Claims, 3 Drawing Sheets

THE PROPAGATION DIRECTION OF LIGHT

MULTI-CHANNEL ACOUSTO-OPTIC SPATIAL MODULATOR

BACKGROUND OF THE INVENTION

1. Field of the Invention

The present invention relates generally to an acousto-optic modulator, and more particularly, to a multi-channel acousto-optic spatial modulator for fast signal processing by using a plurality of acousto-optic modulating cells connected in a line.

2. Description of the Related Art

One type of conventional multi-channel acousto-optic modulator includes an acousto-optic modulating cell where a plurality of piezoelectric transducers are attached to one surface so that acoustic waves are generated and propagated in parallel with each other. FIG. 1 shows a conventional multi-channel acousto-optic modulator where each channel is constructed by a piezoelectric transducer 22 and an acoustic wave absorber 23 which are both attached to crystal 21 and spaced apart by a constant distance from each other. Signals are applied to the respective channels, and the light is also incident upon each channel at an angle which satisfies the well-known Bragg's angle condition. As the light is transmitted through each channel, it is acousto-optically modulated and processed.

With the conventional multi-channel acousto-optic modulator, the number of displayable pixels is known to be limited to about 2,000, which makes it difficult to employ this type of modulator in an application such as a holographic video system where more than several tens of thousand pixels must be displayed. To overcome the above limitation, light can be acousto-optically modulated by utilizing crystal which has a large aperture in the direction of propagation of the acoustic waves.

A problem however arises when utilizing crystal having a large aperture because it is not easy to manufacture them. Further, since data should be continuously input through a single input end, the time required to input data becomes long and thus it is difficult to input data at a high speed.

Therefore, there is a need for a new multi-channel acousto-optic spatial modulator which can solve the aforementioned problems.

SUMMARY OF THE INVENTION

The object of the present invention is to provide a novel multi-channel acousto-optic spatial modulator in which a plurality of acousto-optic modulating cells are combined to obtain the same effect as using crystal having a large aperture without actually utilizing the same.

Another object of the present invention is to provide a novel multi-channel acousto-optic spatial modulator including acousto-optic modulating cells in which data can be simultaneously input through a plurality of input ends to the acousto-optic modulating cells in synchronism, thereby reducing the required data input time.

In accordance with the aspects of the present invention, an apparatus for acousto-optically modulating light incident thereupon is provided which comprises a plurality of modulating cells each for modulating the incident light, acoustic waves being created within each of said plurality of modulating cells; and a plurality of absorbing plates each interposed between said two modulating cells for shielding the acoustic wave created within one of said two modulating cells from being propagated into the other of said two modulating cells. Each of the modulating cells comprises a unit crystal upon which the light is incident; a piezoelectric transducer coupled to the top surface of the unit crystal and having one pair of electrodes for creating an acoustic wave in the unit crystal in response to the signal applied to the one pair of electrodes; and an acoustic wave absorber coupled to the top surface of the unit crystal for absorbing the acoustic wave propagating in the unit crystal. As a result, a moving diffraction grating is formed within the unit crystal as the acoustic wave created by the piezoelectric transducer is reflected by one side surface of the unit crystal and propagated to the other side surface.

With this structure, pixels displayable by the acousto-optic modulating cells can be aligned continuously in a line. In other words, the acousto-optic modulating cells are connected in series, and the spacing between the modulating cells can be minimized. To this end, electrodes and a piezoelectric transducer in each modulating cell should be attached to the surface of the modulating cell except the surfaces in contact with the adjacent modulating cells. The modulating cell is shaped such that the acoustic wave created by the piezoelectric transducer is propagated in parallel to the bottom surface of the modulating cell after being reflected by one side surface of the modulating cell. One type of acousto-optic modulating cell satisfying this requirement is a prism having a cross section of a symmetric trapezoid. The particular shape of the trapezoid is determined depending on the type of crystal used in the fabrication. In order to achieve the same effect as using an acousto-optic modulator having a large aperture by utilizing the acousto-optic modulating cells having a trapezoidal cross section, the plurality of acousto-optic modulating cells are connected such that the orientation of the top surface of the unit crystal alternates with every cell. With such structure, an array of acousto-optic modulating cells connected in a line is provided which is the same as the acousto-optic modulator having a large aperture in terms of its effect. Therefore, the problem relating to the limited number of pixels is solved, and it is possible to input data at a high speed.

BRIEF DESCRIPTION OF THE DRAWINGS

The aforementioned aspects and other features of the invention will be explained in the following description, taken in conjunction with the accompanying drawings wherein.

DETAILED DESCRIPTION OF THE INVENTION

Figure 1:
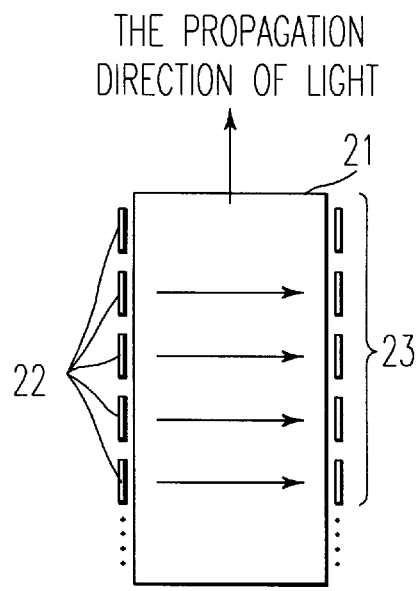
FIG. 1 illustrates a conventional multi-channel acousto-optic modulator.
Figure 2A:
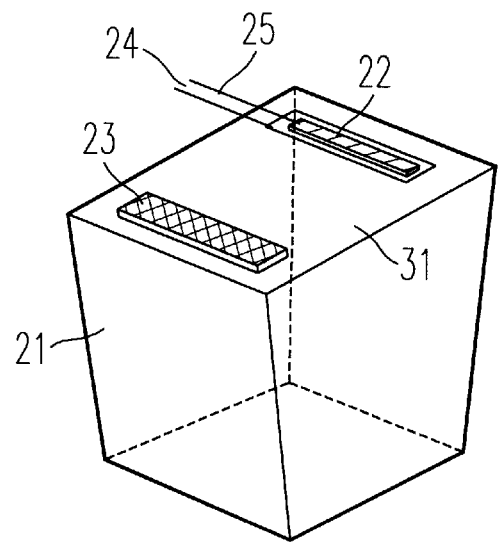
FIG. 2(a) illustrates a single acousto-optic modulating cells which constitutes a multi-channel acousto-optic spatial light modulator in accordance with the present invention.

FIG. 2(a) illustrates a structure of an acousto-optic modulating cell in accordance with the present invention. The acousto-optic modulating cell 20 comprises a unit crystal 21 shaped like a prism and having a cross section of a symmetric trapezoid, a piezoelectric transducer 22 with electrodes 24, 25, and an acoustic wave absorber 23. The top surface 31 of the unit crystal 21 is shaped as a rectangle having two long sides 39 and two short sides 40. The electrode 24 is disposed on the top surface 31 of the unit crystal 21 in parallel with and adjacent to the short side 40. The piezoelectric transducer 22 is mounted on the electrode 24 and the electrode 25 is disposed on the piezoelectric transducer 22. The acoustic wave absorber 23 is disposed on the top surface 31 of the unit crystal 21 in parallel with and adjacent to the short side 40.

Figure 2B:
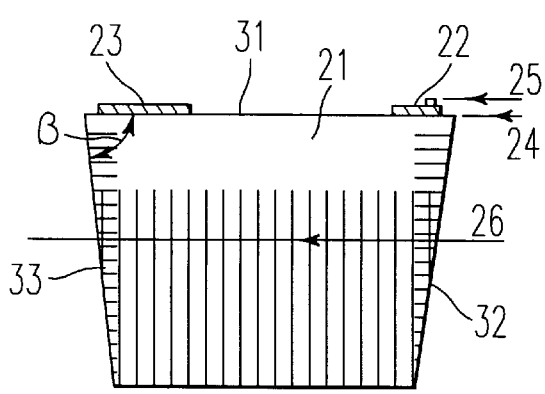
FIG. 2(b) is a cross-sectional view of the acousto-optic modulating cell in FIG. 2(a) taken along the line A—A.

Referring to FIG. 2(b), a view of a cross section of the acousto-optic modulating cell 20 taken along the line A—A in FIG. 2(a) is shown. The propagation direction of the acoustic wave within the cell 20 is represented by lines 26. If a radio frequency signal or a computer-generated holographic signal from a video input is applied to piezoelectric transducer 22 through the electrodes 24, 25, the acoustic wave 26 is created by the piezoelectric effect of the piezoelectric transducer 22. The acoustic wave 26 is propagated within the unit crystal 21 perpendicular to the top surface 31 of the unit crystal 21 and is reflected at the side surface 32 of the unit crystal 21, thereby being propagated in parallel to the top surface 31. After being reflected at the opposite side surface 33, the acoustic wave 26 is upwardly propagated perpendicular to the top surface 31 and finally absorbed by the acoustic wave absorber 23.

In order for the acoustic wave 26 to be propagated in parallel to the top surface 31 after being reflected by the side surface 32, the angle β between the side surface 32 and the top surface 31 for tetragonal crystal must be determined by the following formula:

$$\tan \beta = (C_{11} + C_{22} + 2C_{66})/(C_{11} - C_{12})$$

where $C_{ij}$ is a component value of an elastic constant of crystal.

The angle β is 45° for isotropic crystal. For anisotropic crystal $TeO_2$, the theoretical value of the angle β is 84.45°, while the experimentally determined value is 82.78°. This difference is due to the measurement error of an elastic constant.

Figure 2C:
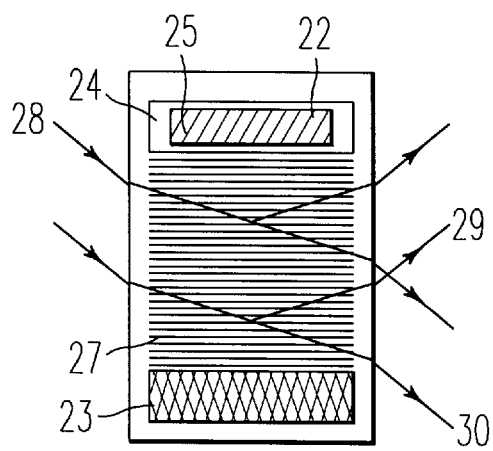
FIG. 2(c) is a top view of acousto-optic modulating cell 20 illustrating a path of the light transmitting through a grating formed within the acousto-optic modulating cell by acoustic waves.

FIG. 2(c) shows a top view of the acousto-optic modulating cell and illustrates a transmission path of the light modulated by the acousto-optic modulating cell. The laser beam 28 satisfying the Bragg's angle condition is incident upon a diffraction grating 27 of crystal created by acoustic waves. Thereafter, the incident laser beam is diffracted by or transmitted through the grating 27. Reference numerals 29 and 30 indicate the light as acousto-optically modulated and diffracted, and the transmitted light, respectively.

Figure 3A:
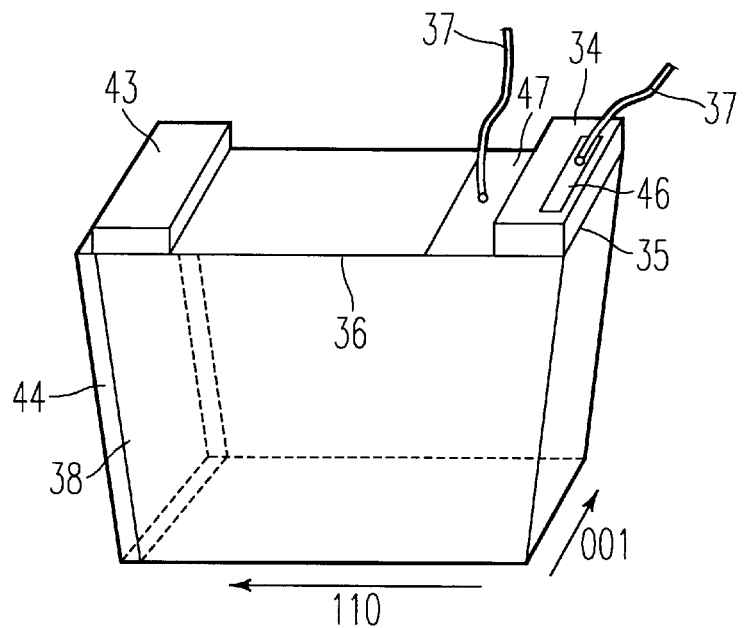
FIG. 3(a) is a view of an acousto-optic modulating cell utilizing anisotropic crystal $TeO_2$ as unit crystal.

An acousto-optic modulating cell utilizing anisotropic crystal $TeO_2$ as unit crystal will now be explained with reference to FIG. 3(a). The acousto-optic modulating cell 60 generally includes unit crystal 21, a piezoelectric transducer 34 with electrodes 46, 47 and an acoustic wave absorber 43.

The detailed descriptions of these common elements will be omitted as they are the same as those described above with respect to FIG. 2(a). The long side 36 of the top surface of the unit crystal 21 made of $TeO_2$ is parallel to the axis [110] of the crystal and the short side 35 is parallel to the axis [001] of the crystal. The piezoelectric transducer 34 with the electrodes 46, 47 and the acoustic wave absorber 43 are attached to the crystal in the same manner as explained in conjunction with FIG. 2(b). The value of β is 82.78° as mentioned before. The driving signal for the piezoelectric transducer 34 is supplied via a conducting line 37. An absorbing plate 44 which is not a part of the acousto-optic modulating cell 60 will be described below in the explanation of a multi-channel acousto-optic spatial modulator with reference to FIG. 4.

Figure 3B:
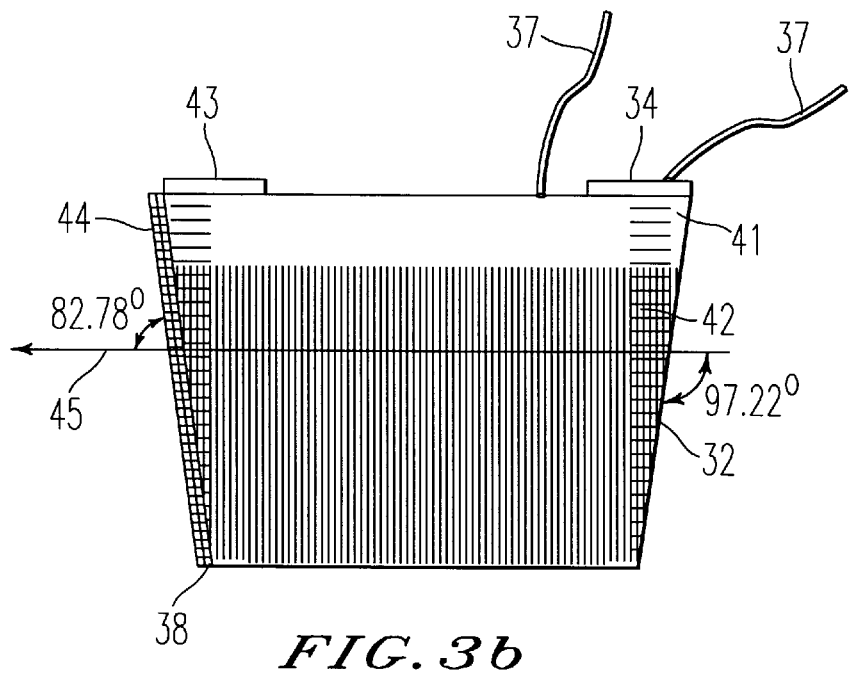
FIG. 3(b) illustrates the propagation direction of an acoustic wave within the acousto-optic modulating cell in accordance with the present invention.

FIG. 3(b) illustrates the propagation direction of an acoustic wave within the acousto-optic modulating cell 60. The acoustic wave 41 created by the piezoelectric transducer 34 is reflected by the side surface 32, and thereafter propagated in parallel to the axis [110] of crystal 21. When the propagating wave 42 is incident upon the opposite side surface 38, a portion of the wave 42 is absorbed by the absorbing plate 44 and the rest of the wave 42 is reflected by the surface 38, thereafter being absorbed by the acoustic wave absorber 43.

Figure 4A:
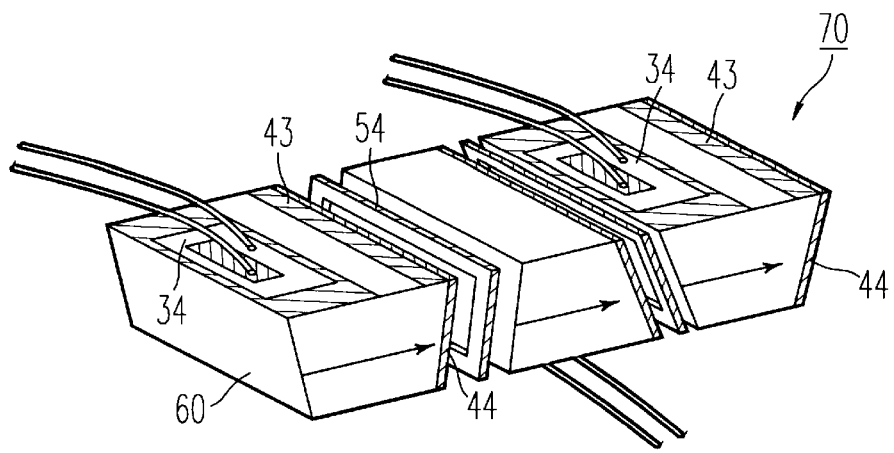
FIG. 4(a) illustrates a structure of a multi-channel acousto-optic spatial modulator in accordance with the present invention.
Figure 4B:
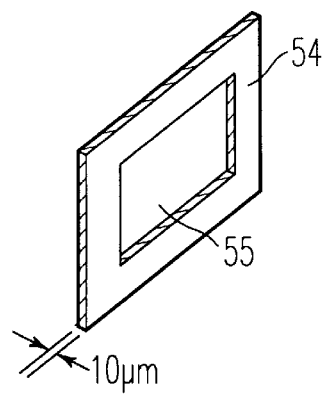
FIG. 4(b) shows a spacer having a window.

A multi-channel acousto-optic spatial modulator will be described which can be constructed by combining a plurality of the acousto-optic modulating cells 60. As shown in FIG. 4(a), the multi-channel acousto-optic spatial modulator 70 is illustrated as comprising a plurality of the acousto-optic modulating cells 60. In order to allow each acoustic wave in each cell 60 to be propagated in the same direction while maintaining a minimum spacing between the cells 60, the acousto-optic modulating cells 60 are connected such that the orientation of the top surface of the cell where the piezoelectric transducer 34 and the acoustic wave absorber 43 are mounted alternates with every cell, such that the top surface of one cell faces up and the top surface of the next cell faces down. When the acousto-optic modulating cells 60 are connected, the absorbing plate 44 made of indium is attached to the side surface 38 (FIG. 3(a)) opposite to the incident surface 32 in order to separate the cells 60 from each other so that the acoustic wave generated by one cell is not propagated to another cell. To enhance the separation degree, one surface of the absorbing plate 44 in contact with one cell is planarized and the other surface thereof in contact with an adjacent cell is irregularly formed so that the contact area with the adjacent cell is minimized. Instead of the absorbing plate 44, a spacer 54 having a window 55 can be used as shown in FIG. 4(b). Alternatively, this spacer 54 can be disposed between the plate 44 and the side surface 32 of the cell 60 so as to further increase the separation degree between the cells 60.

Figure 4C:
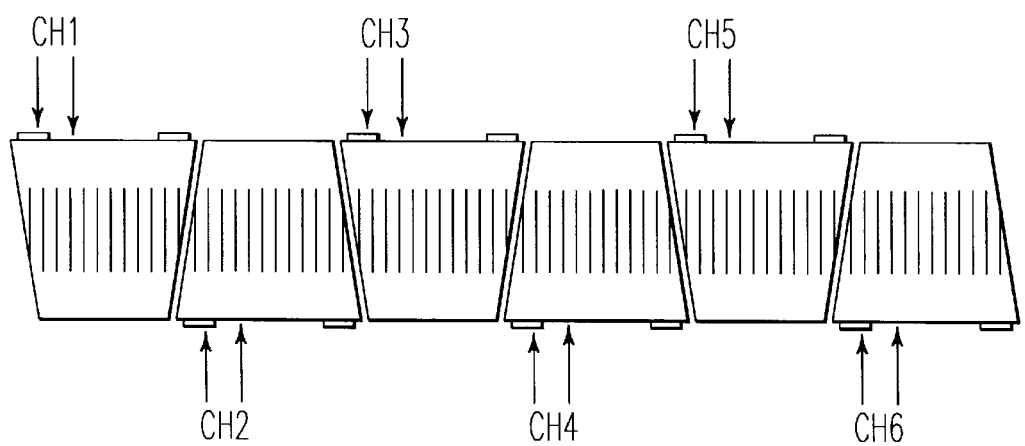
FIG. 4(c) is a view illustrating the way of inputting signals in parallel to the respective channels of a multi-channel acousto-optic spatial modulator in accordance with the present invention.

FIG. 4(c) illustrates the way of inputting signals in parallel to the respective channels of the multi-channel acousto-optic spatial modulator 70 in accordance with the present invention. One continuous line image can be formed as a whole, although the signals are independently input to the respective channels. The number of channels could be increased or decreased as needed by connecting the required number of acousto-optic modulating cells in a line.

As described above, the number of pixels can be extended to several tens of thousands in accordance with the present invention. Also, it is possible to input data in parallel through a number of channels because of the independent operation of each modulating cell. Therefore, data input time can be significantly reduced, and it becomes possible to utilize a pulse laser as a light source.

The present invention has been described with reference to a particular embodiment in connection with a particular application. Those having ordinary skill in the art and access to the teachings of the present invention will recognize additional modifications and applications are within the scope of the present invention. It is therefore intended by the appended claims to cover any and all such applications, modifications, and embodiments within the scope of the present invention.

What is claimed is:

1. An apparatus for acousto-optically modulating a light incident thereupon, comprising:

a plurality of modulating cells each for modulating the incident light, acoustic waves being created within each of said plurality of modulating cells; and a plurality of absorbing plates each interposed between said any two adjacent modulating cells for shielding the acoustic wave created within one of said two modulating cells from being propagated into the other of said two modulating cells, each of said modulating cells comprising, a unit crystal upon which the light is incident;

a piezoelectric transducer coupled to the top surface of said unit crystal and having one pair of electrodes for creating an acoustic wave in said unit crystal in response to the signal applied to said pair of electrodes; and an acoustic wave absorber coupled to the top surface of said unit crystal for absorbing the acoustic wave propagating in said unit crystal, said plurality of modulating cells being connected such that the orientation of the top surface of said unit crystal alternates with every cell, whereby a moving diffraction grating is formed within said unit crystal as the acoustic wave created by the piezoelectric transducer is reflected by one side surface of said unit crystal and propagated to the other side surface.

2. The apparatus of claim 1, wherein said unit crystal takes the form of a prism whose cross section is shaped like a reverse trapezoid.

3. The apparatus of claim 2, wherein the acoustic wave reflected by said one side surface of said unit crystal is propagated in parallel to the bottom surface of said unit crystal.

4. The apparatus of claim 3, wherein said unit crystal is a tetragonal crystal, and the angle $\beta$ between one side surface and the bottom surface of the tetragonal crystal satisfies $$\tan \beta = (C_{11} + C_{22} + 2C_{66})/(C_{11} - C_{12})$$

where $C_{ij}$ is a component value of an elastic constant of said tetragonal crystal.

5. The apparatus of claim 1, wherein the top surface of said unit crystal takes the shape of a rectangle having two short sides and two long sides, and wherein said piezoelectric transducer is attached to the top surface of said unit crystal parallel to one short side of the top surface, and said acoustic wave absorber is attached to the top surface of said unit crystal parallel to the other short side of the top surface opposite to said one short side.

6. The apparatus of claim 1 further comprising a plurality of spacer each having a window and interposed between each modulating cell and the absorbing plate of the adjacent modulating cell for further separating acoustic waves between said modulating cells.

7. The apparatus of claim 1, wherein the signal applied to said one pair of electrodes is independently applied to each modulating cell.

8. The apparatus of claim 1, wherein the orientation of the surface of said unit crystal alternates with every cell such that the top surface of one of said modulating cells faces upwards and the top surface of the next modulating cell faces downwards.

9. An acousto-optic modulating cell for acousto-optically modulating a light incident thereupon, comprising:

a crystal upon which the light is incident;

a piezoelectric transducer coupled to the top surface of said crystal and having one pair of electrodes for creating an acoustic wave in said crystal in response to the signal applied to said one pair of electrodes; and an acoustic wave absorber coupled to the top surface of said crystal for absorbing the acoustic wave propagating in said crystal, whereby a moving diffraction grating is formed with respect to said incident light within said crystal as the acoustic wave created by the piezoelectric transducer is reflected by one side surface of said crystal and propagated to the other side surface, said acoustic wave absorber absorbing the acoustic wave reflected by said other side surface of said crystal.

10. The acousto-optic modulating cell of claim 9, wherein said crystal takes the form of a prism whose cross section is shaped like a reverse trapezoid.

11. The acousto-optic modulating cell of claim 10, wherein the acoustic wave reflected by said one side surface of said crystal is propagated in parallel to the bottom surface of said crystal.

12. The acousto-optic modulating cell of claim 11, wherein said crystal is a tetragonal crystal, and the angle $\beta$ between one side surface and the bottom surface of the tetragonal crystal satisfies $$\tan \beta = (C_{11} + C_{22} + 2C_{66})/(C_{11} - C_{12})$$

where $C_{ij}$ is a component value of an elastic constant of said tetragonal crystal.

13. The acousto-optic modulating cell of claim 9, wherein the top surface of said crystal takes the shape of a rectangle having two short sides and two long sides, and wherein said piezoelectric transducer is attached to the top surface of said crystal parallel to one short side of the top surface, and said acoustic wave absorber is attached to the top surface of said crystal parallel to the other short side of the top surface opposite to said one short side.

* * * * *